United States Patent [19]
Ernst

[11] 3,937,119
[45] Feb. 10, 1976

[54] MASONRY ANCHOR DEVICE

[75] Inventor: Richard John Ernst, Elk Grove Village, Ill.

[73] Assignee: Illinois Tool Works, Inc., Chicago, Ill.

[22] Filed: Dec. 23, 1974

[21] Appl. No.: 535,536

[52] U.S. Cl. ................................................ 85/47
[51] Int. Cl.² ........................................ F16B 25/00
[58] Field of Search ............................ 85/46, 41, 47

[56] References Cited
UNITED STATES PATENTS

| | | | |
|---|---|---|---|
| 1,802,560 | 4/1931 | Kerwin | 85/47 |
| 2,096,937 | 10/1937 | Memanus | 85/47 |
| 3,134,290 | 5/1964 | Jentuft | 85/47 |
| 3,207,023 | 9/1965 | Knohl | 85/46 |
| 3,739,682 | 6/1973 | Siebol | 85/41 |
| 3,861,269 | 1/1975 | Laverty | 85/46 |

Primary Examiner—Edward C. Allen
Attorney, Agent, or Firm—T. W. Buchman; R. W. Beart

[57] ABSTRACT

A screw type anchor device for securement into masonry structures. A sharp crested helical thread, preferably with tapering crest diameter, is formed along the shank and helical protuberances forming guide means are spaced along the shank between adjacent convolutions of the helical thread. Notches are formed on the crests of the helical thread along the length of the shank to facilitate embedment of the crests in the walls of a performed bore in the masonry structure.

10 Claims, 5 Drawing Figures

U.S. Patent  Feb. 10, 1976  3,937,119
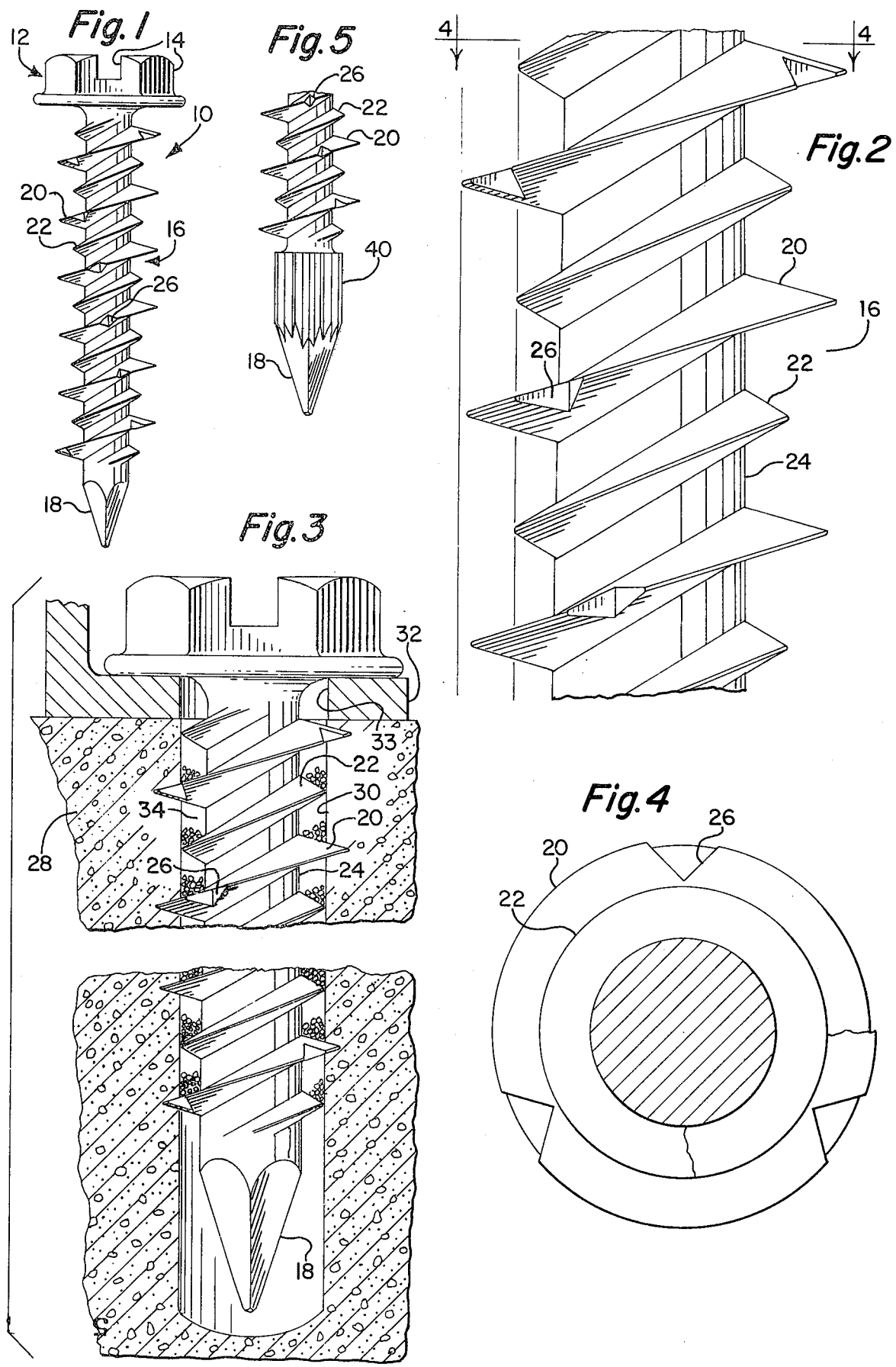

MASONRY ANCHOR DEVICE

The present invention relates generally to an anchor device and more particularly to such a device which is designed to be secured within a bore formed in a masonry structure.

In the attachment of panels, supports, channels or other devices to a masonry-like structure, it is commonplace to utilize a stud anchor which incorporates a wedging mechanism. Such devices frequenty require a manipulation of the wedge to properly set the device within the bore and will also require a secondary fastener member, such as a nut, to be placed over the workpiece and tightened on the stud. Removability, when desired, is a major problem when using the prior art devices.

The anchor device of the present invention eliminates many of the deficiencies of prior art devices and provides a simple, one-piece, easily installed fastener which will not require a secondary operation to secure a workpiece to a support structure of masonry.

It is a primary object of the invention to provide an anchor device which can be readily inserted in a bore formed in a masonry structure by a rotary motion thus allowing conventional threaded fastener driving tools to be used.

Still another object of the invention is to provide a rotary fastener type anchor device which can be inserted and embedded in a masonry-like structure with a minimal amount of torque.

Yet another object of the invention is to provide a one-piece masonry anchor which can be inserted through a workpiece into and anchored in the masonry structure in a single operational step.

An advantage of the anchor device of the present invention is that the structure provides for firm embedment of a helical thread portion without appreciably disturbing the wall structure of the bore adjacent the embedment.

Still a further advantage of the present invention is the ability to utilize dust and aggregate particles removed during embedment to further enhance the pullout strength of the anchor device.

The objects and advantages are attained according to the invention by the provision of a threaded fastener device including a first convolution of sharp crested threads spaced along the shank and a second convolution of helical protuberances spaced between the convolutions of the sharp crested threads. Notches are provided in the crests of the sharp crested thread along at least the entering portion of the shank. The crest diameter of the thread is preferably tapered toward the entering portion of the shank so that the thread portion of the fastener will progressively chip into and embed in the wall of the bore in the masonry structure. The helical protuberances will be preferably of a uniform height throughout the length of the shank and corresponding to the diameter of the bore thus serving to accurately center the device during the embedment.

Other objects and advantages of the present invention will become apparent from the following description and the accompanying drawings wherein:

FIG. 1 is a side elevational view of an anchor device embodying the invention.

FIG. 2 is an enlarged partial side elevational view of a preferred embodiment of the invention.

FIG. 3 is a partial sectional view showing an anchor device incorporating features of the present invention embedded in a masonry-like structure.

FIG. 4 is a cross-sectional view taken along the lines A—A of FIG. 2.

FIG. 5 is a partial side elevational view showing a modified form of the invention.

Referring now more specifically to the drawings wherein like elements are designated by the same numerals throughout the various figures, an anchor device 10 incorporating the features of this invention is shown. Turning first to FIG. 1, the anchor device 10 is shown as including an enlarged head 12 with appropriate rotation inducing surfaces 14, an elongated shank 16 with a substantially pointed entering extremity 18. A sharp crested helical thread 20 is formed along the length of the shank providing a first plurality of convolutions and a helical protuberance 22 is formed along the length of the shank, spaced between adjacent convolutions of the thread 20 and providing a second plurality of convolutions. The thread 20 and helical protuberance 22 will have substantially the same pitch. The crest diameter of the thread 20 will be greater than the maximum radial dimension provided by the helical protuberances 22 for a purpose to be explained later herein.

A series of notches 26 are formed in the crest of the helical thread 20. These notches will extend along a line from the entering extremity of the shank toward the trailing extremity and preferably will extend the entire length of the shank. For most efficient results, the line of notches will extend approximately 90° to the crest lines of the associated thread convolutions 20.

The configuration and arrangement of the notches 26 is best shown in the enlarged FIGS. 2 and 4. From FIG. 4, it will be apparent that three longitudinally extending lines of notches may be formed on the shank thus providing three masonry removing elements on each convolution of the thread 20. It is important to note also from FIG. 4 that the depth of penetration of the notches 26 onto the crest of the threads does not generally exceed a depth which is defined by the height of the helical protuberance 22.

While the crest diameter of the threads 20 may be uniform throughout the length of the shank, it is preferable that the crest diameter uniformly decrease from the trailing extremity of the shank to the entering extremity providing a gradually tapered crest configuration. This preferred embodiment is clearly shown in FIG. 2. It should be noted that while the crests of the thread 20 may taper, the helical protuberances 22 should remain of a uniform height throughout the length of the shank in order to properly center the device in the bore.

With reference to FIG. 3, the operation of the anchor device 10 will now be described. The masonry-like structure 28 is provided with a bore 30 through the use of a conventional masonry-type drilling device. One of the advantages of the present invention is that the work panel or device to be attached 32 may be positioned on the support structure and provided with an aperture 33 during the drilling operation. When the structure and panel have been so prepared, the anchor device 20 is inserted in the bore 30 utilizing a generally conventional rotary fastener driving apparatus.

As the device 10 is rotatably and axially inserted into the bore, the relatively sharp crests of the thread 20 are embedded in the side walls of the bore. The flank angle of the thread 20 is preferably 30° to facilitate this embedment. The notches 26 formed in the crests of the thread 20 gradually chip and remove masonry material from the side walls permitting the thread to be firmly embedded therein. With the preferred tapered embodiment, the notches will serve to gradually remove segments of the wall of the bore to accomplish embedment. The notches 26 formed on the tapered crest configuration may be of progressively decreasing radial penetration into the crests from the trailing extremity to the entering extremity to facilitate the gradual removal procedure. These notches 26, in conjunction with the tapering of the crest diameter shown in the preferred embodiment of FIG. 2, enable the insertion of the device to be accomplished with a minimum of disturbance of the wall structure in the bore. This is important because of the nature of the masonry-type material which generally tends to crumble and loses its capability to be anchored thereto. The gradual chipping performed by the notches during the continued rotation of the device serves to insure the firm embedment of at least the larger, upper, thread portion of the convolutions 20.

Attention is now directed to the helical protuberance 22 which serves a vital function in the use of the anchor device 10 in a masonry-like environment. Since this protuberance 22 is of a substantially uniform height along the length of the shank, it provides a substantially constant radial dimension preferably equal to or slightly larger than the bore dimension. This feature serves to guide and accurately center the device in the bore. Without such guide means, the device could be tilted in the bore as it is driven due to the presence of aggregate on one side of the bore and not on the other. It should be apparent that a device which is positioned in an inclined manner will not provide the maximum amount of pull-out resistance since the crests will not be uniformly embedded about the periphery of the shank.

The thread 20 and helical protuberance or guide means 22 are spaced from one another by slight axial root portions 24 on the shank. As best shown in FIG. 3, these spaces and cooperating opposing surfaces of the guide means 22 and thread 20 afford enhancement of the operability of the device. As the dust or aggregate particles are gradually removed from the wall of the bore through the agency of notches 26, the material removed is trapped in a reservoir 34 formed between adjacent convolutions and utilizing the space 24. The ability of the dust and aggregate particles to be received in a reservoir rather than acting on the device in the form of torsional friction enables the device to be inserted at relatively low torque levels. The retention of the dust particles in the reservoirs could also enhance the pull-out strength of the anchor.

While the entering point 18 may be of any desired configuration, a substantially pointed tip is preferred to accurately locate the device in a bore. The point may be configured with features enabling the device to form the bore, such as self-drilling features. In conjunction with this tip, a reaming or sizing section 40 may be provided between the point and the first convolutions of the thread and guide means as shown in the modification of FIG. 5. Such a section 40 will serve to accurately prepare the diameter of the bore to conform generally with the transverse dimension of the guide means 22. It should be understood that other forms of reaming sections could be used in the invention other than the longitudinal splines shown herein. It is intended that this invention cover such other configurations that accomplish sizing the bore.

Thus it is apparent that there has been provided, in accordance with the invention, a masonry anchor device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. An anchor device for insertion and retention in a bore of a predetermined diameter formed in a masonry type support surface, the device comprising an axially extending shank with an enlarged head portion at a trailing extremity, the head portion including rotation inducing surfaces, a helical thread with a sharp crest formed on the shank and extending substantially the entire length of the shank providing a first plurality of convolutions extending along the shank, helical guide means formed on the shank extending substantially the entire length of the shank and providing a second plurality of convolutions extending along the shank, the guide means being of substantially uniform predetermined crest diameter along the length of the shank, the second plurality of convolutions being positioned between adjacent first plurality of convolutions along the shank, the helical thread having a predetermined crest diameter which is greater than the predetermined crest diameter of the helical guide means, and which uniformly decreases from the trailing extremity of the shank to the entering extremity, notch means formed in the crests of the helical thread on at least a plurality of the first convolutions adjacent the entering extremity of the shank, the notch means thereby enabling the sharp crests of the helical thread to become firmly embedded in the side walls of the bore as the device is rotated about its longitudinal axis by chipping the side wall of the bore to an increasing depth as the helical thread progresses into the bore, the diameter of the helical guide means being substantially equal to the predetermined diameter of the bore so that the device is centered in the bore and the embedment of the crest portions of the helical thread is substantially uniform about the periphery of the shank, the adjacent first and second convolutions being spaced from each other along the shank thereby providing a reservoir to receive and retain the masonry material removed from the side walls of the bore due to the embedment of the crest portions of the helical thread therein.

2. The anchor device of claim 1, wherein the notch means progressively decrease in radial penetration on the crests of the helical thread from the trailing extremity to the entering extremity of the shank.

3. The anchor device of claim 1, which includes hole sizing means on the shank between the entering extremity of the shank and the extremities of the helical thread and helical guide means adjacent the entering extremity of the shank, the hole sizing means having a maximum transverse dimension substantially equal to the diameter of the helical guide means.

4. The anchor device of claim 1, wherein the notch means are formed on substantially all of the first convolutions.

5. The anchor device of claim 1, wherein the notch means includes a plurality of notches on each of the plurality of first convolutions.

6. The anchor device of claim 1, wherein the helical thread has an included angle of about 30°.

7. The anchor device of claim 1, wherein the notch means are formed in a line along the length of the shank which is substantially perpendicular to the crests of the helical thread.

8. The anchor device of claim 1, wherein the notch means penetrate the crests of the helical thread to a depth not greater than a depth defined by the height of the helical guide means.

9. An anchor device for insertion and retention in a bore of a predetermined diameter formed in a masonry type support surface, the device comprising an axially extending shank with an enlarged head portion at a trailing extremity and a workpiece entering portion at the opposite extremity, the head portion including rotation inducing surfaces, a helical thread with a sharp crest formed on the shank and extending substantially the entire length of the shank providing a first plurality of convolutions extending along the shank, helical guide means formed on the shank extending substantially the entire length of the shank and providing a second plurality of convolutions extending along the shank, the crest diameter of the guide means being substantially uniform along the length of the shank, the second plurality of convolutions being positioned between adjacent first plurality of convolutions along the shank, the crest diameter of the helical thread uniformly tapering from a maximum diameter adjacent the head to a minimum diameter adjacent the entering portion and having a predetermined height from crest to root which is greater than the predetermined height of the helical guide means throughout the length of the shank, the root diameter of the shank being substantially uniform along the length of the shank, notch means formed in the crests of the helical thread on at least a plurality of the first convolutions adjacent the entering extremity of the shank, the notch means thereby enabling the sharp crests of the helical thread to become firmly embedded in the side walls of the bore as the device is rotated about its longitudinal axis by gradually increasing the depth of embedment in the side wall as the tapered, notched crests chip the side wall, the diameter of the helical guide means being substantially equal to the predetermined diameter of the bore so that the device is centered in the bore and the embedment of the crest portions of the helical thread is substantially uniform about the periphery of the shank, the adjacent first and second convolutions being spaced from each other along the shank thereby providing a reservoir to receive and retain the masonry material removed from the side walls of the bore due to the embedment of the crest portions of the helical thread therein.

10. An anchor device for insertion and retention in a bore of a predetermined diameter formed in a masonry type support surface, the device comprising an axially extending shank with an enlarged head portion at a trailing extremity, the head portion including rotation inducing surfaces, a helical thread with a sharp crest formed on the shank and extending substantially the entire length of the shank providing a first plurality of convolutions extending along the shank, helical guide means formed on the shank extending substantially the entire length of the shank and providing a second plurality of convolutions extending along the shank, the guide means being of substantially uniform predetermined crest diameter along the length of the shank, the second plurality of convolutions being positioned between adjacent first plurality of convolutions along the shank, the helical thread having a predetermined crest diameter which is greater than the predetermined crest diameter of the helical guide means, and which uniformly decreases from the trailing extremity of the shank to the entering extremity, notch means formed in the crests of the helical thread on at least a plurality of the first convolutions adjacent the entering extremity of the shank, the innermost portion of the notch means in each crest being at a diameter at least as great as the diameter of the guide means but not less than said guide means diameter, the notch means progressively decreasing in radial penetration on the crests of the helical thread from the trailing extremity of the shank to the entering extremity of the shank, the notch means thereby enabling the sharp crests of the helical thread to become firmly embedded in the side walls of the bore as the device is rotated about its longitudinal axis, the diameter of the helical guide means being substantially equal to the predetermined diameter of the bore so that the device is centered in the bore and the embedment of the crest portions of the helical thread is substantially uniform about the periphery of the shank, the adjacent first and second convolutions being spaced from each other along the shank thereby providing a reservoir to receive and retain the masonry material removed from the side walls of the bore due to the embedment of the crest portions of the helical thread therein.

* * * * *